US008126651B2

(12) United States Patent
Saltzer et al.

(10) Patent No.: US 8,126,651 B2
(45) Date of Patent: Feb. 28, 2012

(54) METHOD FOR OBTAINING POROSITY AND SHALE VOLUME FROM SEISMIC DATA

(75) Inventors: Rebecca L. Saltzer, Houston, TX (US); Christopher J. Finn, Missouri City, TX (US); Rongrong Lu, Houston, TX (US)

(73) Assignee: ExxonMobil Upstream Research Co., Houston, TX (US)

( * ) Notice: Subject to any disclaimer, the term of this patent is extended or adjusted under 35 U.S.C. 154(b) by 680 days.

(21) Appl. No.: 11/922,815

(22) PCT Filed: Jun. 6, 2006

(86) PCT No.: PCT/US2006/021954
§ 371 (c)(1),
(2), (4) Date: Feb. 19, 2009

(87) PCT Pub. No.: WO2007/001759
PCT Pub. Date: Jan. 4, 2007

(65) Prior Publication Data
US 2009/0271118 A1 Oct. 29, 2009

Related U.S. Application Data

(60) Provisional application No. 60/694,069, filed on Jun. 24, 2005.

(51) Int. Cl.
*G01V 1/00* (2006.01)
*G01V 1/28* (2006.01)
(52) U.S. Cl. ............... 702/14; 702/15; 702/16; 702/17; 702/18
(58) Field of Classification Search .............. 702/14–18, 702/48, 57, 66–77, 196, 179–181
See application file for complete search history.

(56) References Cited

U.S. PATENT DOCUMENTS

| 5,583,825 | A  | * | 12/1996 | Carrazzone et al. | ............ 367/31 |
| 5,798,982 | A  | * | 8/1998  | He et al. | ........................ 367/73 |
| 5,999,486 | A  | * | 12/1999 | DeVault | ......................... 367/36 |
| 6,091,669 | A  | * | 7/2000  | Chen | ............................... 367/37 |
| 6,529,833 | B2 | * | 3/2003  | Fanini et al. | ..................... 702/7 |

(Continued)

OTHER PUBLICATIONS

Stolt et al. (1985), "Migration and inversion of seismic data", Geophysics 50, pp. 2458-2472.*

(Continued)

*Primary Examiner* — Phuong Huynh
(74) *Attorney, Agent, or Firm* — ExxonMobil Upstream Research Co. Law Dept.

(57) ABSTRACT

Method for obtaining rock parameters such as porosity and vshale directly from inversion of seismic data corresponding to a single trace location. This method is distinguished from existing methods that obtain elastic properties from inversion of seismic data, then relate the elastic parameters to rock lithology parameters such as porosity or vshale because it is accomplished in one step, can incorporate anisotropy and does not require multiple trace locations for stability. The data are separated into partial stacks, and a wavelet is specified for each stack. A set of linearized equations are constructed relating seismic reflectivity to changes in elastic parameters, and another set of linearized equations is constructed relating the changes in elastic parameters to the lithologic parameters. The linearized reflectivity equations are combined with the linearized rock physics equations, convolved with the specified wavelets, and equated to the seismic data. The resulting matrix equations are then inverted and a solution is obtained for all offsets simultaneously.

26 Claims, 2 Drawing Sheets

U.S. PATENT DOCUMENTS 6,665,615 B2 * 12/2003 Van Riel et al. .................. 702/2
7,424,367 B2 * 9/2008 Saltzer et al. .................. 702/14

OTHER PUBLICATIONS

PCT Wriiten Opnion by US Office for PCT/US2006/021954, Feb. 9, 2007.*
Stolt et al. (1985), "Migration and inversion of seismic data", Geophysics 50, pp. 2458-2472.*
Aki, K et al. (1980) "Plane Waves in Homogeneous Media and Their Reflection and Transmission at a Plane Boundary," *Quantitative Seismology Theory and Methods*, v.1, Chapter 5, pp. 123-192.
Brac, J. et al. (1992) "Inversion With a priori Information: An Approach to Integrated Stratigraphic Interpretation," *Reservoir Geophysics*, ed. Sheriff, pp. 251-258.
Castagna et al. (1993) *Offset-dependent reflectivity—theory and practice of AVO analysis*, Society of Exploration Geophysicists.
Cooke, D. et al. (1983) "Generalized Linear Inversion of Reflection Seismic Data," *Geophysics*, 48.6, pp. 665-676.
Hampson, D. et al., (2001) "Use of Multiattribute Transforms to Predict Log Properties From Seismic Data," *Geophysics* 66.1, pp. 220-236.
Helgesen, J. et al. (1993) "Estimation of Elastic Parameters From AVO Effects in the Tau-P Domain," *Geophysical Prospecting* 41, pp. 341-366.
Landro, M. et al. (1995) "Target-Oriented AVO Inversion of Data From Valhall and Hod Fields," *The Leading Edge*, pp. 855-861.
Lortzer, G. et al. (1992) "An Integrated Approach to Lithologic Inversion—Part I: Theory," *Geophysics* 57.2, pp. 233-244.
Martinez, R. et al. (1992) "Complex Reservoir Characterization by Multiparameter Constrained Inversion," *Reservoir Geophysics*, ed. By Sheriff, pp. 224-234.
Menke, W. (1984) *Geophysical Data Analysis: Discrete Inverse Theory*, v. 45, Academic Press, pp. 119-125.
Pan, G. et al. (1994) "An Integrated Target-Oriented Prestack Elastic Waveform Inversion: Sensitivity, Calibration, and Application," *Geophysics* v.59.9, pp. 1392-1404.
Rüger, A. (1997) "P-Wave Reflection Coefficients for Transversely Isotropic Models With Vertical and Horizontal Axis of Symmetry," *Geophysics* 62.3, pp. 713-722.
Shuey, R. (1985) "A Simplification of the Zoeppritz Equations," *Geophysics* 50.4, pp. 609-614.
Simmons, J. et al. (1996) "Waveform-Based AVO Inversion and AVO Prediction-Error," *Geophysics* 61.6, pp. 1575-1588.
Stolt, R. H. et al. (1985) "Migration and Inversion of Seismic Data," *Geophysics* 50.12, pp. 2458-2472.
Thomsen, L. (1986) "Weak Elastic Anisotropy," *Geophysics* 51.10, pp. 1954-1966.
Yilmaz, O. (1987) "Deconvolution," *Seismic Data Analysis*, v.1, Chapter 2, pp. 159-270.
PCT International Search and Written Opinion dated Feb. 9, 2007 5 pages.
EP Standard Search Report #112984 dated Jan. 25, 2006, 2 pages.

* cited by examiner

METHOD FOR OBTAINING POROSITY AND SHALE VOLUME FROM SEISMIC DATA

This application claims the benefit of U.S. Provisional Application No. 60/694,069 filed on Jun. 24, 2005.

FIELD OF THE INVENTION

This invention relates generally to the field of geophysical prospecting and, more particularly, to lithology inversion and methods for predicting sand (or shale) volume and porosity in sub-surface rocks from seismic data.

BACKGROUND OF THE INVENTION

To determine petroleum reserves, build geological models and develop optimal depletion plans, it is useful to know the distribution of sand and shale throughout the reservoir as well as the associated porosity of those rocks. Hydrocarbons (e.g., oil or gas) that are located in sand that is low porosity or poorly connected are much harder to drain than higher porosity, blocky sands. By sending acoustic waves through the subsurface and then recording the reflected waves that are returned, it is possible to obtain an image of the structure of the subsurface called the seismic reflectivity. As part of the data processing, the reflectivity profiles are often organized to form regularly spaced lines in two orthogonal directions that together comprise a 3-dimensional volume of the earth. A system of mathematical equations can be constructed that relate the amplitude of the seismic response to the intrinsic structure of the rocks that are reflecting the waves. Inversion methods can then be used to solve all of these equations simultaneously. (Inversion is any process whereby for a quantity y known to depend on one or more variables x, the values of x corresponding to measured values of y are inferred.) Current inversion methods obtain impedances or other attributes from seismic data, but none directly obtain porosity and shale volume (vshale) or clay content estimates. Shale or clay acts as a barrier to hydrocarbon flow, and their pore spaces are typically filled with water rather than hydrocarbons. Even when their pore spaces do contain hydrocarbons, it is very hard to extract such oil. What is not shale or clay in the siliciclastic depositional systems generally is sand. Thus, identifying the sands and the amount of connectivity between regions of sand is a major requirement for efficient reservoir production.

The amplitudes of reflected seismic waves that have traveled through the subsurface are related to changes in the elastic parameters (such as P and S impedances, P and S-wave velocities, and/or density) of the rocks between one layer and the next, as well as the angle of incidence with which the wave impinged on the boundary. Consequently, changes in amplitude as a function of receiver offset (AVO) can be used to infer information about these elastic properties. To take advantage of this phenomenon, subsets of seismic reflection data corresponding to particular offsets (or angles) or small groups of offsets (or angles) can be processed into what are called angle stacks. ("Offset" is the distance between a receiver and the seismic source.)

A commonly used method for determining vshale (i.e., clay content) and porosity from seismic reflection data (or attributes of the seismic data) is to invert angle stacks to obtain elastic properties (such as P and S impedances, P and S-wave velocities, and/or density) and then to look for relationships between those inverted parameters and the actual parameters of interest (i.e., lithologic parameters such as the porosity of the rock and whether it is a sand or a shale). This is a two-step process and has the disadvantage that the seismic reflectivity is related mathematically to elastic properties rather than the actual parameters of interest. Textbooks with the mathematical details of AVO include Aki and Richards, *Quantitative Seismology*, W. H. Freeman and Co, (1980) and Castagna and Backus, *Offset-dependent reflectivity-theory and practice of AVO analysis*, Society of Exploration Geophysicists (1993). Details of how to perform elastic inversion are contained in many papers, including D. Cooke and W. Schneider, "Generalized linear inversion of reflection seismic data", *Geophysics* 48, 665-676, (1983); and J. Helgesen and M Landro, "Estimation of elastic parameters from AVO effects in the Tau-P Domain", *Geophysical Prospecting* 41, 341-355, (1993); and J. Simmons and M. Backus, "Waveform-based AVO inversion and AVO prediction-error", *Geophysics* 61, 1575-1588, (1996). Other publications describe methods of relating elastic parameters obtained in elastic inversion to the lithologic parameters of interest, for example, G. Lortzer and Berkhout, "An integrated approach to lithologic inversion-Part I: Theory", *Geophysics* 57, 233-244 (1992). Some publications discuss both pieces together—elastic inversion followed by some sort of lithology inversion or transformation, for example, Pan, et al., "An integrated target-oriented prestack elastic waveform inversion", *Geophysics* 59, 1392-1404 (1994); Martinez, et al., "Complex Reservoir Characterization by Multiparameter Constrained inversion", *Reservoir Geophysics*, ed. By Sheriff, 224-234, (1992); J. Brac, et al., "Inversion with a priori information: an approach to integrated stratigraphic interpretation", *Reservoir Geophysics*, ed. Sheriff, p 251-258, (1992); and M. Landro and A. Buland, "Target-oriented AVO inversion of data from Valhall and Hod fields," *The Leading Edge*, 855-861 (1995). However, none of these papers proposes inverting the angle stacks of seismic reflection data directly for the compositional parameters of interest.

AVO techniques have also been the subject of a number of prior patents. U.S. Pat. No. 5,583,825 to Carrazone, et al. provides a number of literature references and discusses many of these prior patents. All of them involve predictions of the P-wave and S-wave reflectivities from full stack data rather than angle stacks. U.S. Pat. No. 6,665,615 to Van Riel et al. describe joint inversion of angle stacks to obtain elastic parameters (e.g., P-impedance, S-impedance, P-wave velocity, S-wave velocity, and density) with a method that requires simultaneously inverting multiple offsets from multiple trace locations in order to stabilize the result. In that same patent they also suggest the possibility of inverting compositional parameters (e.g., porosity and vshale) from seismic data using angle stacks, however, the inventors do not describe how such an inversion would be mathematically constructed and successfully accomplished.

Another class of methods for predicting clay content and porosity from seismic data uses pattern recognition, often implemented with neural networks, to relate changes in amplitude as a function of receiver offset with changes in lithology or porosity in the subsurface as described in, for example, Hampson, et al., "Use of multi-attribute transforms to predict log properties from seismic data", *Geophysics* 66, 220-236 (2001). These methods use a training set to identify patterns between the well and the seismic data and then classify the remainder of the seismic data set according to the patterns observed in the training set. Consequently, the training set needs to contain a set of relationships that span the entire range of possible relationships that might be found in the reservoir (i.e., the training set requires examples from wells that have penetrated different sections of the reservoir in order to train the network competently). In regions of limited well control the relationships derived in this manner cannot be used with confidence. With sufficient well control, probabilistic neural networks can be very good interpolators (although generally terrible extrapolators). In regions of limited of well control, they are unreliable interpolators and worse extrapolators.

A method is needed for obtaining porosity and vshale estimates directly from inversion of seismic data. To reduce computational complexity, the method should be applicable to multiple offsets at a single trace location. Such a method would offer significant cost reduction over existing methods, and would provide more accurate lithology predictions which should reduce the number of dry holes drilled and improve well placement. The present invention satisfies this need.

SUMMARY OF THE INVENTION

In one embodiment, the invention is a computer-implemented method for determining rock and fluid-type parameters (for example, porosity and shale volume fraction) of a subsurface region directly from measured seismic reflection data at a single trace location, said method comprising: (a) pre-processing the measured reflection data into a plurality of partial stacks; (b) specifying a wavelet for each of the stacks; (c) constructing a linearized set of reflectivity equations that relate seismic reflectivity to changes in elastic parameters (for example, P and S acoustic impedances, P and S-wave velocities, and density) of said subsurface region; (d) constructing a linearized set of rock physics equations that relate changes in the elastic parameters to the rock and fluid-type parameters; (e) combining the linearized reflectivity equations with the linearized rock physics equations; (f) forming matrix equations by convolving the specified wavelets with the combined set of equations and equating to the measured data; and (g) inverting the matrix equations to solve by numerical methods for said rock and fluid-type parameters, said solution being for all offsets simultaneously at a single trace location.

BRIEF DESCRIPTION OF THE DRAWINGS

The present invention and its advantages will be better understood by referring to the following detailed description and to the attached drawings in which.

The invention will be described in connection with its preferred embodiments. However, to the extent that the following description is specific to a particular embodiment or a particular use of the invention, this is intended to be illustrative only, and is not to be construed as limiting the scope of the invention. On the contrary, it is intended to cover all alternatives, modifications and equivalents that may be included within the spirit and scope of the invention, as defined by the appended claims.

DETAILED DESCRIPTION OF PREFERRED EMBODIMENTS

The present invention is a method for inferring the clay content and porosity of a reservoir directly from the seismic reflection data by solving a system of equations that relate the changes in seismic amplitude as a function of offset (AVO) to the lithologic parameters of interest, vshale and porosity. (The term "vshale" will be understood to herein mean shale volume fraction.) This one-step inversion has several predictive advantages over two-step approaches that need to find elastic parameters as an intermediate step. First, because the inversion is constrained to obtain the parameters of interest rather than to obtaining intermediate parameters, the final fit to the data is always equal to and generally better than any result that can be obtained with a series of inversions, unless one or more of those inversions are nonlinear. Second, the starting model for the inversion is based on the parameters of interest (such as the general shale and porosity trends of the earth) and therefore is likely to be more accurate than some intermediate parameters (such as the velocity and density structure) that are less well understood. Third, the ability to easily incorporate anisotropic terms in this one-step manner is very useful since many crustal parts of the earth exhibit anisotropic behavior.

Figure 1:
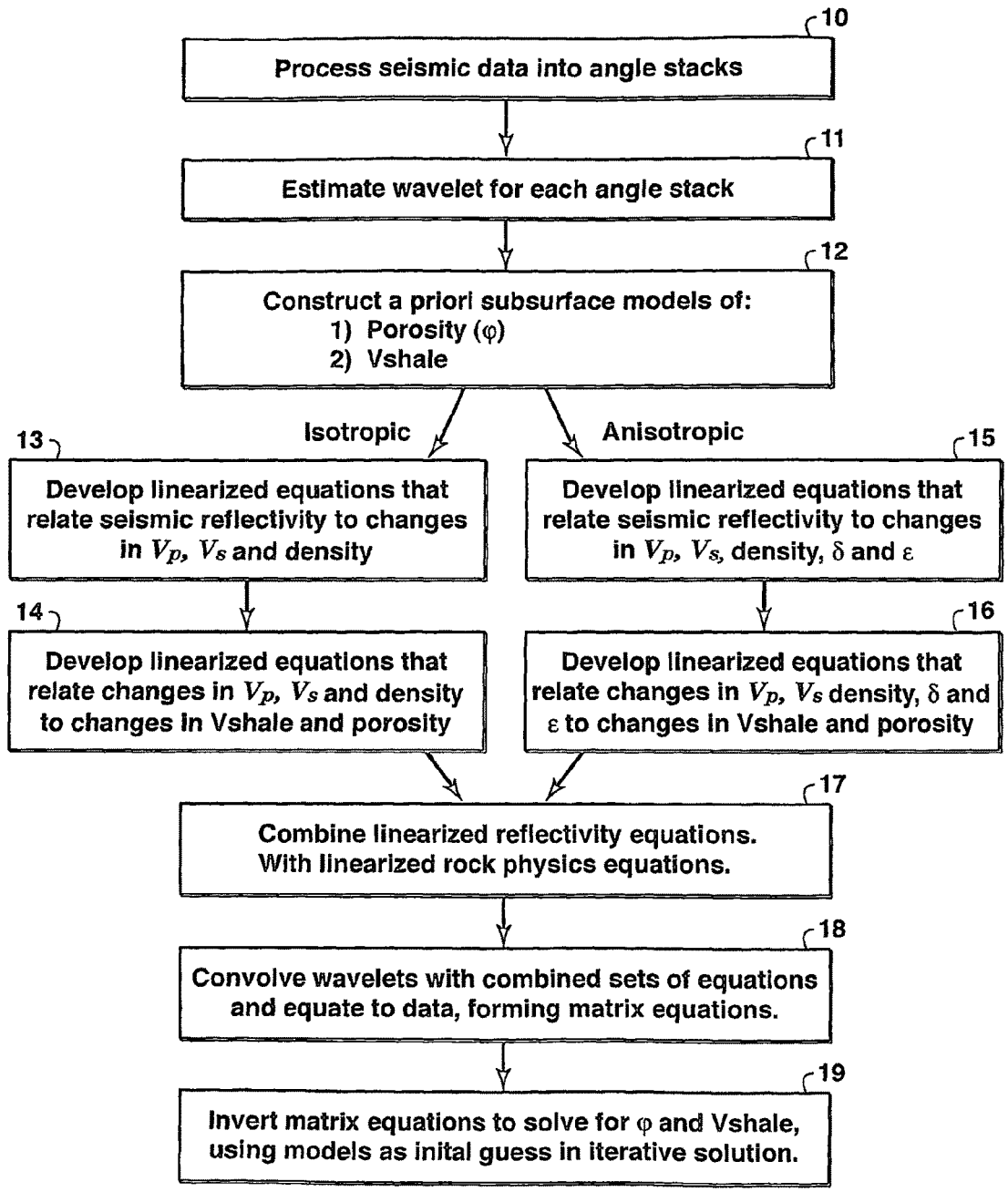
FIG. 1 is a flow chart of basic steps in some embodiments of the present inventive method.

Because the invention works most effectively by exploiting changes in AVO, the seismic reflection data are preferably organized into partial angle stacks, each partial angle stack consisting of reflection data for a limited range of subsurface incidence angles. Typically the range of angles encompassed in such stacks are chosen to be narrow enough so as to minimize the variation in change of the reflection coefficient while at the same time chosen to be broad enough so as to enhance the signal to noise ratio for the stacking. The original offset gathers can also be used with the present invention by mapping the offsets into angles by raytracing through the velocity function used in the data processing. Typically, the data are processed to enhance the PP (P-wave to P-wave reflectivity), and this is the mode that is used to extract the lithology and porosity parameters. However, converted data (P down and S up or vice versa), SS (S-wave down and up) or combinations of PP, SS, PS, and SP reflection data can also be used. In the event that converted mode or SS data are used, it is preferable to process the data into angle stacks and to align the reflecting horizons; however, it is also possible to use full stacks. Processing the seismic data into stacks is shown as step 10 in the flow chart of FIG. 1. The problem is formulated by treating the recorded seismic data as the convolution of a wavelet with the earth's reflectivity:

$$\text{Wavelet} * \text{reflectivity} = \text{data} \qquad (1)$$

where the * operator denotes a certain mathematical operation called convolution which can be described by $$Ref(t, \theta) = \frac{1}{2}(1 + \tan^2\theta)\frac{\partial}{\partial t}\ln Vp(t) - \qquad (2)$$

$$4\frac{\overline{V}_S^2}{\overline{V}_P^2}\sin^2\theta\frac{\partial}{\partial t}\ln Vs(t) + \frac{1}{2}\left(1 - 4\frac{\overline{V}_S^2}{\overline{V}_P^2}\sin^2\theta\right)\frac{\partial}{\partial t}\ln\rho(t)$$

A wavelet must be estimated for each stack. (Step 11) A simple method, assuming the data have been processed so as to convert the wavelet to zero-phase, is to compute the Fourier spectrum of the data, set the phase equal to zero, take the inverse Fourier transform, and call that the wavelet. This method assumes that the reflectivity spectrum of the earth is white. More sophisticated methods for inferring wavelets are described in textbooks such as *Seismic Data Processing* (1987) by Oz Yilmaz or *Applied Geophysics* by Sheriff and Geldart (1990). The reflectivity as a function of angle (or receiver offset) can be written (step 13) in terms of changes in the P-wave velocity (Vp), S-wavevelocity (Vs), and density ($\rho$) contrasts using a generalization of the Aki & Richards (1980) reflectivity equation derived by R. H. Stolt and A. B.

Weglein in "Migration and inversion of seismic data," *Geophysics* 50, 2458-2472, (1985):

$$Ref(t, \theta) = \frac{1}{2}(1 + \tan^2\theta)\frac{\partial}{\partial t}\ln Vp(t) - \qquad (2)$$
$$4\frac{V_S^2}{V_P^2}\sin^2\theta\frac{\partial}{\partial t}\ln Vs(t) + \frac{1}{2}\left(1 - 4\frac{V_S^2}{V_P^2}\sin^2\theta\right)\frac{\partial}{\partial t}\ln\rho(t).$$

The averaged squared velocity terms in the equation are preferably averages over the two layers on either side of the interface that is the reflecting surface. Alternatively, one could use Shuey's linearized equations in *Geophysics* 50, 609-614 (1985) where the equations are rewritten with a dependence on Poisson's ratio, taking the form Ref($\theta$)=A+B sin$^2(\theta)$+C tan$^2(\theta)$ and then develop a different set of linearized rock physics equations. When SS or converted modes are used, the appropriate linearized expression for the SS, PS, and SP reflection coefficients is substituted for equation (2)—see Aki and Richards, *Quantitative Seismology* published by W. H. Freeman & Co. (1980) for example. (The term linearized is used herein when a relationship that may not be perfectly linear in theory is nevertheless approximated by a linear equation.) The person skilled in the art may know other ways to construct a set of linear equations that relate the seismic data to the elastic parameters Vp, Vs and $\rho$. However, the actual parameters of interest are rock properties and so another set of equations is required. The elastic parameters Vp, Vs and $\rho$ can be related (step 14) to the rock properties of vshale (vsh) and porosity ($\phi$) through linearized rock physics equations of the following form:

$$A_1\phi+B_1 vsh+C_1=\ln Vp$$

$$A_2\phi+B_2 vsh+C_2=\ln Vs$$

$$A_3\phi+B_3 vsh+C_3=\ln \rho \qquad (3)$$

Where the A, B, and C coefficients are constants that may be derived from linear regression of well log data or by applying relationships measured in the lab from rock samples or from simple, linear or linearized rock physics models. Different rock physics relations are preferably derived for each fluid type (gas, oil, water). Relationships for different fluids may be generated by fluid substitution if all fluids are not observed in the well or measured in the lab. A separate volume containing the fluid contacts may be used when the matrix is actually constructed to make sure the correct set of rock physics relations are applied to the appropriate locations within the volume.

Combining eqns. (2) and (3) (step 17 of FIG. 1) into eqn. (1) yields a set of matrix equations (step 18) that can be symbolically written as:

$$[Wavelet]\begin{bmatrix}\text{Aki \&} \\ \text{Richards}\end{bmatrix}[Derivative]\begin{bmatrix}\text{Rock} \\ \text{Physics}\end{bmatrix}\begin{bmatrix}\phi \\ vsh\end{bmatrix} = [\text{data}] \qquad (4)$$

that can be rewritten in terms of a single matrix "G":

$$[G]\begin{bmatrix}\phi \\ vsh\end{bmatrix} = [\text{data}]. \qquad (5)$$

The G matrix contains the functional relations between what one wishes to know ($\phi$ and vsh as a function of time) and what can be observed (the seismic amplitudes as a function of offset). In eqn. (4), the matrix labeled Aki & Richards represents eqn. (2) or any other linearized set of equations that relate seismic reflectivity to changes in elastic parameters, with the matrix labeled "Derivative" containing the partial derivative operators from eqn. (2) in its diagonal elements with off-diagonal elements all zeroes. The matrix "Rock Physics" represents a linearized set of equations such as eqns. (3) that relate changes in the elastic parameters to the model parameters. The column matrix with elements $\phi$ and vsh is the vector that contains whatever model parameters are to be solved for. For illustrative purposes, the model parameters are shown as being $\phi$ and vsh but might instead include other rock or fluid-type parameters such as changes in pore pressure and water saturation for the case of the application of the invention to time-lapse seismic data (discussed below). In a typical example, the column matrix might have twenty components, the first ten being the values of porosity at ten different depths (or travel times), and the next ten components being the vshale values at the same ten depth intervals. The data matrix would consist of the measured seismic reflection data from those same ten depths at different offsets or angles but from a single trace location. The solutions for $\phi$ and vsh are then the calculated values of porosity and vshale at the ten different depths corresponding to the data trace location. If the data were stacked into 3 angles, then there would be a near-, mid- and far-angle stack. In this example, G is a 20×20 array and data is a 30×1 column matrix whose elements are the seismic amplitude at each of the ten depth intervals at the particular (x,y) location, the first ten corresponding to the near-angle stack amplitudes, the second ten corresponding to the mid-angle stack amplitudes and the last ten corresponding to the far-angle stack amplitudes.

Eqn. (4) is based on the well known equivalence of the convolution operation as defined in integral form above to a term-by-term multiplication of two time series, repeating this after shifting the terms of one series one sample (one time unit), and continuing to shift and repeat until the two series have no corresponding non-zero terms, summing all the results. The skilled practitioner will understand how to construct the wavelet matrix in eqn. (4) so that the matrix multiplication indicated by eqn. (4) generates the sum of products just described.

Standard inversion methods such as are described in W. Menke, *Geophysical Data Analysis: Discrete Inverse Theory* can be used (step 19) to invert the G matrix and obtain a "best guess" for porosity and vshale. In order to improve the quality of the solution, an a priori "starting model" can be used as a starting point for the inversion (step 12). This model does not have to be particularly complicated. It can be based on general porosity and shale trends, as observed in nearby wells, although more complicated starting models are also permissible. The model would actually be two models, one for porosity and the other for shale volume.

Adding Anisotropic Terms

In the case where the rocks are behaving anisotropically with a vertical axis of symmetry, eqn. (2) can be replaced (step 15) with a relationship such as Rüger's approximation for the P-wave reflectivity in transversely isotropic media ("P-wave reflection coefficients for transversely isotropic models with vertical and horizontal axes of symmetry", *Geophysics* 62, 713-722, (1997)). Generalizing this equation from single to multiple interfaces in a similar manner to the Stolt & Weglein (1985) isotropic generalization, one can obtain:

$$Ref(t) = \frac{1}{2}(1+\tan^2\theta)\frac{\partial}{\partial t}\ln Vp(t) - 4\frac{\overline{V}_S^2}{\overline{V}_P^2}\sin^2\theta\frac{\partial}{\partial t}\ln Vs(t) + \qquad (6)$$

$$\frac{1}{2}\left(1-4\frac{\overline{V}_S^2}{\overline{V}_P^2}\sin^2\theta\right)\frac{\partial}{\partial t}\ln\rho(t) + \frac{1}{2}\sin^2\theta\frac{\partial}{\partial t}\delta + \sin^2\theta\tan^2\theta\frac{\partial}{\partial t}\varepsilon$$

which, is similar to eqn. (2) except it contains two additional terms that serve to modify the reflectivity response as a function of angle (receiver offset). These terms are based on the L. Thomsen's δ and ε anisotropy parameters ("Weak Elastic Anisotropy" *Geophysics* 51, 1954-1966, (1986)), which describe the near-vertical anisotropic response and the difference between the vertical and horizontal P-wave velocities respectively. In this particular anisotropic embodiment of the invention that uses Ruger's approximation, the vertical velocity is used in the natural log terms.

If two additional linearized equations are derived for the rock physics relationship in the same form as eqn. (3) but with δ and ε as the parameters of interest, one obtains (step 16):

$$A_4\phi + B_4 vsh + C_4 = \delta$$

$$A_5\phi + B_5 vsh + C_5 = \varepsilon \qquad (7)$$

(log measurements of δ and ε do not exist routinely, so estimates such as those that may be obtained from lab measurements or forward modeling experiments may be used), after which a set of anisotropic equations similar to eqn. (4) can be constructed:

$$[Wavelet][R\ddot{u}ger][Deriv]\begin{bmatrix} RP \\ Anisotropy \end{bmatrix} \cdot \begin{bmatrix} \phi \\ vsh \end{bmatrix} = [Data] \qquad (8)$$

and simplified again to yield an anisotropic analog to eqn. (5):

$$\begin{bmatrix} G \\ anisotropic \end{bmatrix}\begin{bmatrix} \phi \\ vsh \end{bmatrix} = [data] \qquad (9)$$

that, again, can be solved using standard inversion techniques. The end result is the same two model parameters, porosity and vshale, but the internal mapping within the G matrix contains anisotropic terms that better describe the AVO behavior that occurs in anisotropic regimes. In anisotropic rocks with more complicated symmetry systems, it would be possible to account for the anisotropy by, for example, defining a coordinate system that is aligned with the three anisotropic axes (the fast, slow and intermediate velocity direction) and then computing the weights for those three directions and then computing the stacks in each of those three directions.

Inversion Alternatives

In one embodiment of the invention, a damped least squares formalism is used to solve the linearized set of equations. This involves appending a damping matrix below the G matrix that is a diagonal matrix of ones and appending a vector containing the a priori, starting models for the porosity and vshale to the bottom of the data vector. These models represent a starting point for the inversion and can be derived from very low-frequency (simple, with little detail) estimates of what the background porosity and vshale distribution in the earth is most likely to be. The damping matrix and associated portion of the data vector are multiplied by coefficients (α and β) that are determined by a series of tests in which the coefficients are varied and the RMS error of the predicted synthetic data and the observed data are compared. The optimal damping parameters are chosen and the resulting matrix has the following form:

$$\begin{bmatrix} [G] \\ \alpha \cdot 1 \\ \beta \cdot 1 \end{bmatrix}\begin{bmatrix} \phi \\ vsh \end{bmatrix} = \begin{bmatrix} [data] \\ \alpha \cdot \phi_{low-freq} \\ \beta \cdot vsh_{low-freq} \end{bmatrix}. \qquad (10)$$

With appropriate choices of α and β, this particular parameterization produces a solution that both honors the seismic reflection data and honors the geoscientist's expectation of the most likely earth structure.

Instead of using damped least squares, many standard methods for inverting matrices are available and could be used instead. These include, for example, singular value decomposition, weighted least squares, and maximum likelihood methods, as well as nonlinear methods such as simulated annealing or genetic algorithms. Any choice of inversion algorithm is within the scope of the present invention. A person skilled in the art will be familiar with such techniques.

Time-Lapse Data

When multiple seismic reflection surveys have been obtained over time for a field as it is being produced, the changes in reflectivity as a function of time can be modeled as changes in pressure ($\Delta P$) and water saturation ($\Delta Sw$). The rock physics relationships are replaced with these linearized pressure and water saturation equations and the seismic data vector contains the differences between them. The coefficients of the Aki & Richards equations (eqn. 2) remain the same; however, the data vector contains the difference between the base and monitor surveys and the model vector (what is being solved for) contains differences in Vp, Vs and ρ as a result of production. The final set of equations take the form:

$$[G]\begin{bmatrix} \Delta P \\ \Delta Sw \end{bmatrix} = \begin{bmatrix} data \\ differences \end{bmatrix} \qquad (11)$$

An alternative formulation is obtained by simultaneously inverting the time lapse surveys (rather than their differences) for porosity and lithology as well as changes in pressure and water saturation. Yet another formulation is to independently invert the surveys (rather than their differences) and then take the difference of the result. Common to each such embodiment of the method is that the differences observed between these surveys can be exploited to yield information about changes in water saturation and pressure as a field is being drained.

EXAMPLE

Figure 2:
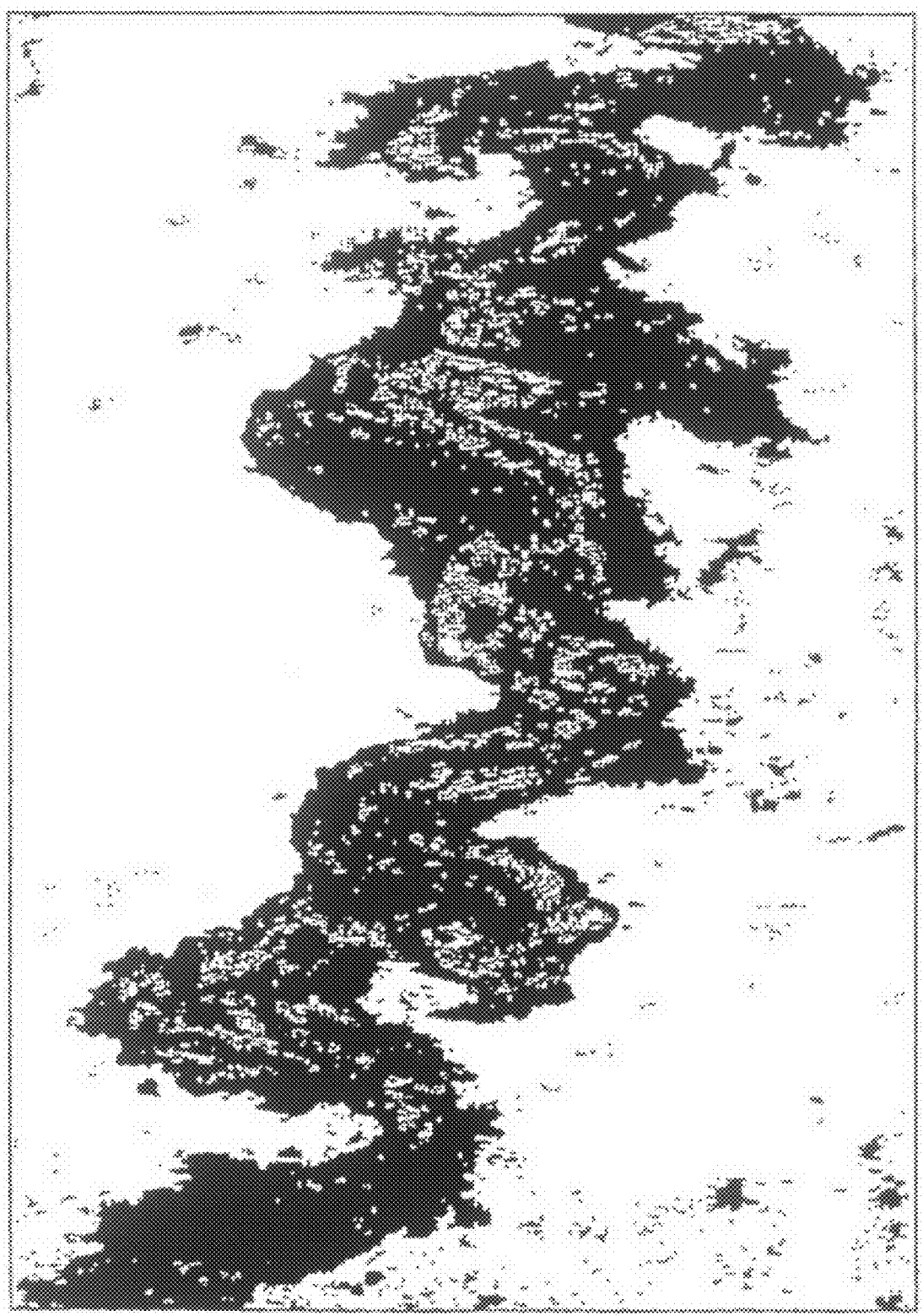
FIG. 2 shows a sand channel winding through a vshale data volume that was inferred by use of the present inventive method.

The present inventive method was applied to actual seismic data acquired over a potential oil field. FIG. 2 shows a picture of a 3-D image on a black background of the inferred sand channel winding through an inverted vshale volume (the shaly parts have been made invisible). Vshale is greater than 50% everywhere except where the sand channel is shown. Two wells drilled in the reservoir confirm the location of the sands and the volume percentages. In addition to aiding in well placement, accurate sand/shale volume predictions such as above (FIG. 2) can be used to estimate reserves, both of which are important in the early development phases of a field when well control is limited and business risk is greatest.

The invention claimed is:

1. A computer-implemented method for determining rock and fluid-type parameters of a subsurface region from measured seismic reflection data corresponding to a plurality of offsets at a single trace location, said method comprising:
   a. pre-processing the measured reflection data into a plurality of partial stacks;
   b. specifying a wavelet for each of the stacks;
   c. constructing a linearized set of reflectivity equations that relate seismic reflectivity to changes in elastic parameters of said subsurface region;
   d. constructing a linearized set of rock physics equations that relate changes in the elastic parameters to the rock and fluid-type parameters;
   e. combining the linearized reflectivity equations with the linearized rock physics equations;
   f. forming matrix equations by convolving the specified wavelets with the combined set of equations and equating to the measured data; and
   g. inverting the matrix equations to solve by a numerical method for said rock and fluid-type parameters, said solving by a numerical method being for all of the offsets simultaneously at the single trace location, wherein at least (g) is performed on a computer.

2. The method of claim 1, wherein said rock and fluid-type parameters include porosity and shale volume fraction.

3. The method of claim 1, wherein said elastic parameters are at least one of a group consisting of P and S acoustic impedances, P and S-wave velocities, and density.

4. The method of claim 1, wherein each said wavelet is estimated by computing the Fourier spectrum of the seismic data corresponding to said stack after said data have been processed to correspond to a zero-phase wavelet, setting the phase of said transformed data equal to zero, and then performing an inverse Fourier transform.

5. The method of claim 1, wherein said linearized set of equations that relate seismic reflectivity to changes in elastic parameters are based on the following equation for reflectivity as a function of time t and reflection angle $\theta$:

$$Ref(t, \theta) = \frac{1}{2}(1 + \tan^2\theta)\frac{\partial}{\partial t}\ln Vp(t) - 4\frac{\overline{V}_S^2}{\overline{V}_P^2}\sin^2\theta\frac{\partial}{\partial t}\ln Vs(t) + \frac{1}{2}\left(1 - 4\frac{\overline{V}_S^2}{\overline{V}_P^2}\sin^2\theta\right)\frac{\partial}{\partial t}\ln \rho(t)$$

Where $V_P$ is P-wave velocity, $V_S$ is S-wave velocity, and $\rho$ is density.

6. The method of claim 2, wherein said linearized set of rock physics equations are:

$A_1\phi + B_1 vsh + C_1 = \ln Vp$ $A_2\phi + B_2 vsh + C_2 = \ln Vs$ $A_3\phi + B_3 vsh + C_3 = \ln \rho$ where $A_1$, $A_2$, $A_3$, $B_1$, $B_2$, $B_3$, $C_1$, $C_2$ and $C_3$ are constants derived from linear regression of well log data, $\phi$ is porosity, vsh is the shale volume fraction, $V_P$ is P-wave velocity, $V_S$ is S-wave velocity and $\theta$ is density.

7. The method of claim 1, wherein an a priori model of the subsurface region is used as a starting model for iterative inversion of the matrix equations, said model comprising values of said rock and fluid-type parameters at a plurality of spatial positions.

8. The method of claim 1, further comprising separating P-wave data from S-wave data and combining said partial stacks to form full stacks.

9. The method of claim 1, wherein the linearized reflectivity equations are anisotropic.

10. The method of claim 9, wherein said linearized reflectivity equations are based on the following equation for reflectivity as a function of time t and reflection angle $\theta$:

$$Ref(t) = \frac{1}{2}(1 + \tan^2\theta)\frac{\partial}{\partial t}\ln Vp(t) - 4\frac{\overline{V}_S^2}{\overline{V}_P^2}\sin^2\theta\frac{\partial}{\partial t}\ln Vs(t) +$$
$$\frac{1}{2}\left(1 - 4\frac{\overline{V}_S^2}{\overline{V}_P^2}\sin^2\theta\right)\frac{\partial}{\partial t}\ln\rho(t) + \frac{1}{2}\sin^2\theta\frac{\partial}{\partial t}\delta + \sin^2\theta\tan^2\theta\frac{\partial}{\partial t}\varepsilon$$

where $V_P$ is P-wave velocity, $V_S$ is S-wave velocity, $\rho$ is density, and where $\delta$ and $\epsilon$ are anisotropy parameters describing near-vertical anisotropic response and the difference between the vertical and horizontal P-wave velocities, respectively.

11. The method of claim 1, wherein said linearized rock physics equations include anisotropic terms.

12. The method of claim 11, wherein said rock and fluid-type parameters include porosity and shale volume fraction, and said linearized set of rock physics equations are:

$A_1\phi + B_1 vsh + C_1 = \ln Vp$ $A_2\phi + B_2 vsh + C_2 = \ln Vs$ $A_3\phi + B_3 vsh + C_3 = \ln \rho$ $A_4\phi + B_4 vsh + C_4 = \delta$ $A_5\phi + B_5 vsh + C_5 = \epsilon$ where $A_1$, $A_2$, $A_3$, $A_4$, $A_5$, $B_1$, $B_2$, $B_3$, $B_4$, $B_5$, $C_1$, $C_2$, $C_3$, $C_4$ and $C_5$ are constants obtained from at least one of a group consisting of linear regression of well log data, lab measurements, and linear rock physics models; and where $\phi$ is porosity, vsh is the shale volume fraction, $V_P$ is P-wave velocity, $V_S$ is S-wave velocity and $\rho$ is density, and where $\delta$ and $\epsilon$ are anisotropy parameters describing near-vertical anisotropic response and the difference between the vertical and horizontal P-wave velocities, respectively.

13. The method of claim 1, wherein said rock and fluid-type parameters include changes in fluid pore pressure and changes in water saturation, and wherein said data are differences in seismic data between two time-lapse seismic surveys.

14. The method of claim 2, wherein said rock and fluid-type parameters further include changes in pressure and changes in water saturation.

15. The method of claim 1, wherein said rock and fluid-type parameters include changes in pressure and changes in water saturation.

16. The method of claim 1, wherein said rock and fluid-type parameters include changes in pressure and changes in water saturation, and further comprising repeating steps (a)-(g) for a second, time lapse data set representing the same subsurface region at a different time, and performing step (h) for both data sets simultaneously.

17. The method of claim 1, wherein said matrix equations are expressed in the following form:

$$[G]\begin{bmatrix} m_1 \\ m_2 \\ \vdots \\ m_N \end{bmatrix} = [\text{data}]$$

Where $m_1, m_2, \ldots m_N$ are said rock and fluid-type parameters, and matrix G contains functional relationships from the combination of the linearized reflectivity equations with the linearized rock physics equations.

18. The method of claim 17, wherein said numerical inversion method minimizes differences between observed and predicted data.

19. The method of claim 18, wherein said numerical inversion method uses a damped, least-squares formalism.

20. The method of claim 19, further comprising adding N rows to the matrix G in the form of a diagonal damping matrix, and adding N elements to said data matrix which is a column vector, said added data elements containing low-frequency values for said rock and fluid-type parameters, all said additional elements being multiplied by coefficients that are determined by comparing predicted synthetic and observed data.

21. The method of claim 18, wherein said numerical inversion method uses a formalism selected from a group consisting of singular value decomposition, weighted least squares, and maximum likelihood methods.

22. The method of claim 18, wherein said numerical inversion method uses a nonlinear method such as simulated annealing or genetic algorithms.

23. The method of claim 1, wherein different linearized rock physics equations are constructed for each fluid type present in said subterranean region, thereby allowing application of the rock physics equations to be consistent with known fluid contact information for said subsurface region.

24. The method of claim 1, wherein the measured reflection data are sorted before stacking according to whether the data represent P-waves or S-waves, before and after reflection.

25. A computer-implemented method for determining rock and fluid-type parameters of a subsurface region from measured seismic reflection data corresponding to a plurality of offsets at a single trace location, said method comprising:
  a. sorting the measured reflection data according to whether the data represent P-waves or S-waves, before and after reflection, and stacking said data into full stacks, each full stack including a pre-selected range of reflection angles;
  b. specifying a wavelet for each of the stacks;
  c. constructing a linearized set of reflectivity equations that relate seismic reflectivity to changes in elastic parameters of said subsurface region;
  d. constructing a linearized set of rock physics equations that relate changes in the elastic parameters to the rock and fluid-type parameters;
  e. combining the linearized reflectivity equations with the linearized rock physics equations;
  f. forming matrix equations by convolving the specified wavelets with the combined set of equations and equating to the measured data; and
  g. inverting the matrix equations to solve by a numerical method for said rock and fluid-type parameters, said solving by a numerical method being for all of the offsets simultaneously at the single trace location, wherein at least (g) is performed on a computer.

26. A method for producing hydrocarbons from a subterranean region, comprising:
  a. obtaining seismic reflection data from a seismic survey of the subterranean region, said seismic reflection data corresponding to a plurality of offsets at a single trace location;
  b. obtaining rock and fluid-type parameters representative of the subterranean region, said parameters having been generated by:
    (i) pre-processing the measured reflection data into a plurality of partial stacks;
    (ii) specifying a wavelet for each of the stacks;
    (iii) constructing a linearized set of reflectivity equations that relate seismic reflectivity to changes in elastic parameters of said subsurface region;
    (iv) constructing a linearized set of rock physics equations that relate changes in the elastic parameters to the rock and fluid-type parameters;
    (v) combining the linearized reflectivity equations with the linearized rock physics equations;
    (vi) forming matrix equations by convolving the specified wavelets with the combined set of equations and equating to the measured data; and
    (vii) inverting the matrix equations to solve by a numerical method for said rock and fluid-type parameters, said solving by a numerical method being for all of the offsets simultaneously at the single trace location, wherein at least (vii) is performed on a computer; and
  c. producing hydrocarbons from the subterranean region using the rock and fluid-type parameters.

* * * * *